United States Patent [19]

Hodgkins et al.

[11] Patent Number: 4,898,668

[45] Date of Patent: Feb. 6, 1990

[54] FUEL FILTER WITH HEATER

[75] Inventors: David H. Hodgkins, Granby; Alex Shinkevich, West Suffield, Conn.

[73] Assignee: Stanadyne Automotive Corp., Windsor, Conn.

[21] Appl. No.: 251,907

[22] Filed: Sep. 30, 1988

[51] Int. Cl.[4] .............................................. B01D 35/8
[52] U.S. Cl. .................................. 210/180; 123/549; 123/557; 210/181; 210/186
[58] Field of Search ................ 210/149, 168, 175, 180, 210/181, 184, 186, 456; 123/549, 557

[56] References Cited

U.S. PATENT DOCUMENTS

| | | | |
|---|---|---|---|
| 2,073,847 | 3/1937 | Miller | 210/149 |
| 2,460,888 | 2/1949 | Koinzan | 210/168 |
| 2,529,698 | 11/1950 | Julius | 210/149 |
| 4,093,548 | 6/1978 | Sterkenburg et al. | 210/180 |
| 4,419,564 | 12/1983 | Marcoux | 123/549 |
| 4,473,054 | 9/1984 | Marcoux et al. | 123/549 |
| 4,491,120 | 1/1985 | Hodgkins | 123/557 |
| 4,539,108 | 9/1985 | Izutani et al. | 210/186 |
| 4,646,703 | 3/1987 | Bradford et al. | 210/184 |
| 4,676,895 | 6/1987 | Davis | 210/184 |
| 4,721,846 | 1/1988 | Lupoli et al. | 123/549 |

FOREIGN PATENT DOCUMENTS 0267645 1/1988 European Pat. Off. ............ 123/549

Primary Examiner—W. Gary Jones
Assistant Examiner—Joseph Drodge

[57] ABSTRACT

A fuel conditioner of the type having a housing defining an inner chamber for receiving a filter element, inlet and outlet ports in the housing for establishing a flow of fuel to and from the chamber, and a heater for raising the temperature of the fuel between the inlet and outlet ports. The improvement comprises a baffle plate situated within the housing between the inlet and outlet ports, for directing substantially all the flow of fuel as a thin layer against a selected interior portion of the housing. The heater is situated on the housing exterior adjacent the interior portion of the housing containing the baffle. The fuel passing through the thin passageway therein reaches its highest velocity in the conditioning unit. Particularly if the flow boundary area defined by the housing and the baffle plate is large compared with the volume of the passageway, very high heat transfer from the heating element to the fuel in the passageway is achieved. Preferably, the heater includes an electrical resistance heating element having a positive coefficient of resistance with increasing temperature of the element.

20 Claims, 2 Drawing Sheets

FUEL FILTER WITH HEATER

BACKGROUND OF THE INVENTION

The present invention relates to apparatus for conditioning fuel for an internal combustion engine, and more particularly, to apparatus for heating the fuel and separating contaminants therefrom.

The practical necessity for conditioning fuel drawn from a fuel tank, prior to introduction into an internal combustion engine, is well known, particularly in diesel engine systems. One example of a known fuel conditioner is described in U.S. Pat. No. 4,491,120, "Fuel Conditioner". In this prior art device, a modular fuel conditioner has a base and a disposable filter-water separator cartridge releasably secured to the base and defining a filter chamber in fluid communication with fuel inlet and outlet passageways in the base. A heater in the fuel path of the base warms the fuel before it enters the cartridge.

These and other fuel conditioners which include heating elements require positive control of the heater element, either by a relatively simple thermal switch, or by a complex electronic control system. On warm days, or after sustained engine operation substantially less heating of the fuel is required than during start-up on days when the ambient temperature is, for example 30 degrees below F.

SUMMARY OF THE INVENTION

It is an object of the present invention to provide a fuel conditioning unit which has a high heat transfer efficiency.

It is a further object of the invention to provide such a fuel conditioner, in which the heat transfer to the fuel is inherently adjusted in inverse relation with the fuel temperature.

The invention is implemented in a fuel conditioner of the type having a housing defining an inner chamber for receiving a filter element, inlet and outlet ports in the housing for establishing a flow of fuel to and from the chamber, and a heater for raising the temperature of the fuel between the inlet and outlet ports. The improvement comprises a baffle plate situated within the housing between the inlet and outlet ports, for directing substantially all the flow of fuel as a thin, turbulent layer against a selected interior portion of the housing. The heater s situated on the housing exterior adjacent the interior portion of the housing containing the baffle. The fuel passing through the thin passageway assures all the fuel passes in close proximity to the hot surface of the housing. Particularly if the flow boundary area defined by the housing and the baffle plate is large compared with the volume of the passageway, very high heat transfer from the heating element to the fuel in the passageway is achieved.

Preferably, the heater includes an electrical resistance heating element having an inherent positive coefficient of resistance with increasing temperature of the element. Thus, during engine operation, as the fuel temperature rises and approaches that of the heating element, the heat generation rate is reduced. Conversely, during start up or early stages of vehicle operation, the fuel temperature is colder and provides a more effective heat sink, drawing heat away from the heating element, under which conditions the heating element supplies a relative higher heat rate.

In a further preferred embodiment of the invention, a heat conductive saddle plate is positioned in intimate contact with the exterior surface of the housing adjacent to the baffle plate. By using positive temperature coefficient wafers or pellets located on the saddle plate and using the saddle plate as a negative potential while the pellets are connected to a positive source of direct voltage, a particularly efficient and low-cost self adjusting fuel conditioning unit is achieved.

BRIEF DESCRIPTION OF THE DRAWINGS

These and other objects and advantages of the present invention will be described below with reference to the accompanying drawings, in which.

DESCRIPTION OF THE PREFERRED EMBODIMENT

Figure 1:
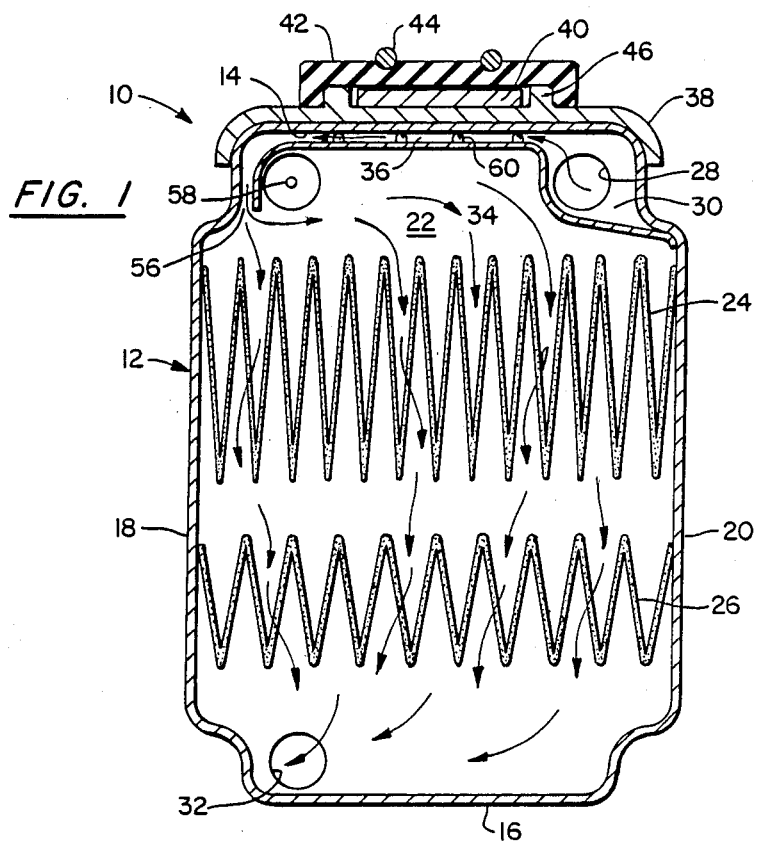
FIG. 1 is an elevation view, in section, of a fuel conditioner in accordance with the present invention.
Figure 2:
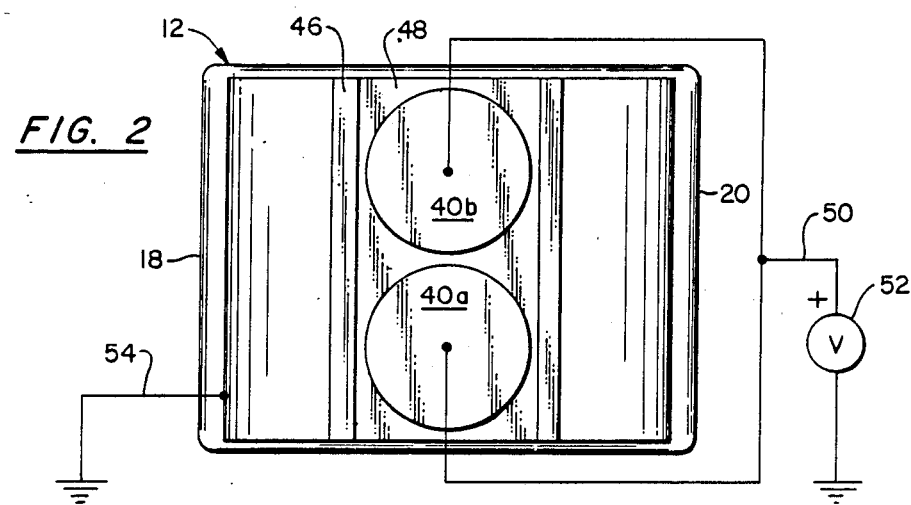
FIG. 2 is a top view of the fuel conditioner of FIG. 1, with the protective cover removed from the heating element wafers.

FIG. 1 shows a fuel conditioner 10, the basic part of which is a housing 12 having a top surface 14, a bottom surface 16 and side surfaces 18, 20. The housing defines an internal region including a chamber 22 in which are located one or more filters, such as a first particulate filter element 24 and a second filter element 26 which may be for particulate or water removal. Near the top of the housing, an inlet port 28 receives fuel from the fuel tank (not shown) and conveys the fuel to plenum region 30, from which it flows downwardly through the filter 24, 26. The conditioned fuel exits the housing 12 through outlet port 32. The fuel conditioner as described to this point is somewhat conventional.

In accordance with the present invention, a baffle plate 34 is disposed along, and spaced slightly from, a portion of the housing inner surface, preferably at the top 14. A narrow flow passageway 36 is thereby defined between the baffle plate 34 and the interior portion of the housing. Although the velocity of the fuel between the inlet port 28 and the outlet port 32 is at a maximum in the passageway 36, as a result of the relatively restricted cross sectional flow area, the configuration of baffle 34 and housing surface 14 achieves excellent total heat transfer to the fuel, as is more fully described below. In one embodiment, the heated boundary surface of the passageway, measured about 1.75×1.75 inches and the flow layer depth is about 0.060 inch. In general, the ratio of heated boundary surface to heated volume should be in the range of 12-20.

The restricted flow passageway 36 is intended to provide a mechanism by which substantial quantities of heat ca be introduced into the fuel between the inlet 28 and the filter chamber 22. A source of heat is intimately connected for thermal transfer through the exterior of the housing inner portion, such as 14, which is in spaced adjacent relation to the baffle 34. Maintenance of this spacing and an increase in flow turbulence are achieved by a plurality of discrete dimples 60 or the like projecting upwardly from baffle 34. The baffle 34 can be biased toward housing top 14 to maintain the spacing control by the dimples.

One satisfactory heater associated with the housing 12 includes a saddle member 38, made of extruded aluminum or other good conductor of heat, and sized to cover substantially all of the exterior of the housing adjacent to the baffle 34. In the embodiment illustrated in FIG. 1, one or more heater elements 40 are connected in intimate thermal contact with the saddle 38, to distribute the generated heat widely over the top surface 14 and into the flow passageway 36. A protective nylon cover 42 and insulators may be placed over the heating element 40, and pivoting clips or the like, as is well known, can be used to secure the cover 42 onto the heating element 40.

The saddle includes a pair of parallel rails 46 defining a heating element surface 48. One or more, for example, two, heating element wafers 40a, 40b are preferably bonded with a thermally conductive bonding agent to the surface 48. Although the heating elements 40a, 40b, could be activated by a power source and associated thermal switch or other control logic, in the preferred embodiment of the invention, the heating elements provide a passive adjustment of the heat generation rate in response to the temperature of the fuel passing through the passageway 36.

The wafers 40a, 40b, are preferably made from a positive temperature coefficient material with one side connected to a positive terminal of a DC voltage source, such as through line 50 and source 52, and the other side connected to a negative ground, such as by an electrical path through saddle 38 into ground 54. The electrical resistance of the element increases with the temperature of the element. When cold fuel is present in or enters the housing 12 through inlet 28 and passes through passageway 36, a large heat sink is presented through saddle 38 to the heating elements 40a, 40b. At low temperature, the resistance to current in the wafers 40a, 40b, is low, so that substantial heat is generated by the elements This heat is conducted through saddle 38, through the top surface 14 of housing 12, and into the fuel in the passageway 36. As the fuel heats up, due to recycling from the fuel pump as is well known in diesel fuel engines, or due to high ambient temperatures, the temperature difference between the saddle 38 and heating elements 40a, 40b increases. The resistance of the heating elements 40a, 40b, increases, and, thus the heat generated for a given DC voltage 52 is less than that associated with operation under cold fuel conditions.

Positive temperature coefficient (PTC) thermistor wafers suitable for use with the present invention can be obtained from various sources, including the Texas Instruments Company, Dallas, Tex. Preferably, each of the several PTC thermistors utilized in the invention is of the low temperature switching variety, having a switching temperature within the range of about 0 degrees Celsius to about 15 degrees Celsius. With this type of a PTC thermistor, substantial wattage is expended at low fuel temperatures to effectively dewax the fuel. As fuel temperature increases with increasing ambient, power consumption is reduced in keeping with traditional PTC operation. The operation of PTC thermistors is well documented and further description is not believed necessary. A suitable heating element would, for a constant voltage, produce at least two, and preferably approximately four times as much heat at 30 degrees F as it would at 90 degrees F. This type of heating element in the illustrated arrangement, with fuel entering at 40 degrees F and flowing at 8 gallons per minute, can produce an 8 degree Centigrade rise in fuel temperature.

In the present invention it is not necessary to make provision for the removal of entrained air in the fuel that may separate from the fuel stream and collect in the top portion of the chamber 22. Air cannot remain in the passageway as the velocity of the incoming fuel will move any air with it through outlet 56. Air that collects on contact with the underside of baffle 34 will act as insulation. If it is desirable to remove all air, it can be passed out through air vent passage 58.

The arrangement of the present invention can easily be unplugged in the summer, where the heater unit would not be necessary.

Although the illustrated embodiment shows the heating of the fuel at the top 14 of the housing 12 in an arrangement whereby the fuel is introduced above the filters 24, 26 and exits the housing below the filters, other locations of the heating elements, and other arrangements of saddle and heater are possible and within the scope of the invention. An arrangement (not shown) with the heating baffle at the bottom of the housing is desirable primarily when it is advantageous to have fuel enter the chamber 22 at the bottom with the fuel outlet being at the top. In such an embodiment any air present is carried up away from the heating baffle because air naturally separates from the fuel by buoyancy and is easily removed through vent 64.

Depending on the location and relative surface areas, different arrangements may also prove satisfactory. In practice, optimum heat transfer requires a good electrical and thermal bonding between the heating element 40a, 40b, and the saddle 38. The saddle 38 should be made from a good conductor of heat and electricity, and a close, thermally intimate fitting of the saddle onto the mating contour surface of the top 14 of the housing is important. If desired, these physical interfaces can be enhanced by the use of contoured sockets.

Figure 3:
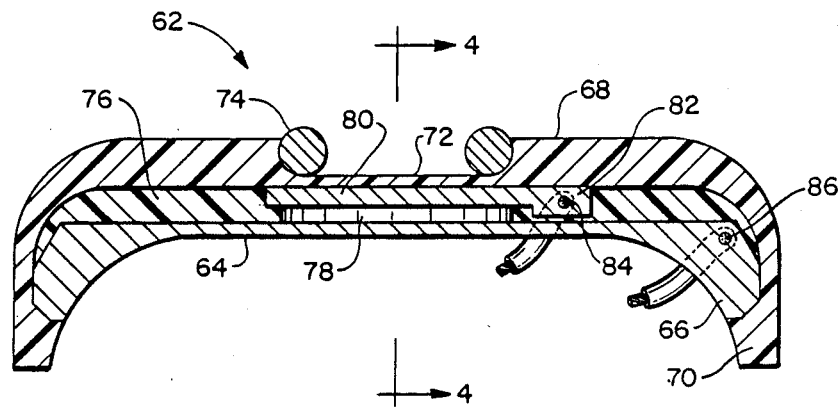
FIG. 3 is an elevation view of an alternative embodiment of the heater.
Figure 4:
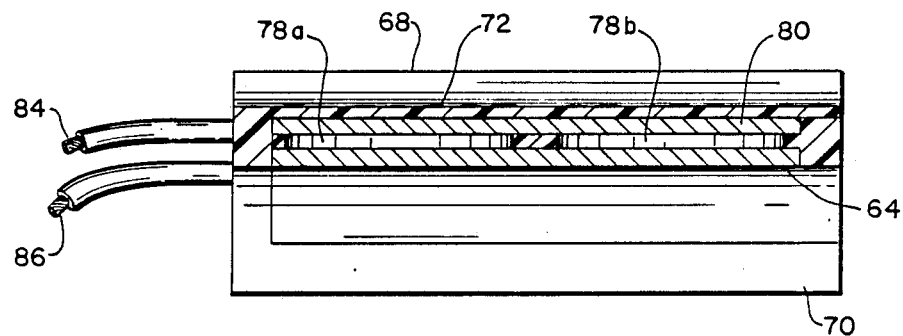
FIG. 4 is a section view along line 4—4 of FIG. 3.

Another heater embodiment is shown in FIGS. 3 and 4. The saddle 64 is preferably an aluminum extrusion having a generally arched lower surface, a flat upper surface, and exteriorly profiled side wings 66. A plastic cover member 68 has a generally arched lower surface and interiorly profiled wings 70 into which wings 66 fit snuggle. The upper surface of the cover has a cutout 72 into which clips 74 are pivoted for securing the heater to the filter housing (not shown).

The saddle 64 and cover 68 fit together so that a space 76 is provided between the saddle upper surface and the cover lower surface. One or more PTC elements 78 are intimately bonded to the top surface of the saddle 64. A metal contact plate 80, preferably an aluminum extrusion, is intimately bonded to the top of the PTC element 78. The plate can have a lug portion 82 to which a positive lead 84 is secured for supplying constant DC voltage to the upper surface of element 78. The space 76 not occupied by element 78 and plate 80, is filled with potting compound, which provides electrical insulation between plate 80 and saddle 64, and thermal insulation to reduce heat loss from the underside of saddle 64. A negative lead 86 is preferably attached to a wing 66 on saddle 64.

One advantage of the present invention is that the heater is external to the housing and can be removed and reused with replacement housings. In addition, the source of heat is not in direct contact with the fuel. Finally, a variety of relationships can theoretically be obtained between the heat generated in the heating elements as a function of element temperature, by judicious optimization of the physical design parameters mentioned above and the specification through the manufacturer of the desired properties of the heating elements 40a, 40b.

The fuel conditioner in accordance with the present invention is simple to manufacture, simple in principle of operation, provides efficient heating, and requires no positive action on the part of the user, while avoiding the complications associated with a thermal switch or control logic circuit.

We claim:

1. A fuel conditioner of the type having a housing defining an inner chamber containing a filter element, inlet and outlet ports in the housing for establishing a flow of fuel through the chamber, and a heater for raising the temperature of the fuel between the inlet and outlet ports, wherein the improvement comprises:
    baffle means within the housing between the inlet and the filter element, said baffle means having a baffle surface which is closely spaced from and generally conforming in shape with a selected interior portion of the housing for directing substantially all the flow of fuel as a layer against said selected interior portion; and
    said heater being situated on the exterior of the housing and including a heating surface in contact with and conforming to said exterior of said selected housing interior portion.

2. The fuel conditioner of claim 1, wherein the baffle surface is substantially in the form of a plate.

3. The fuel conditioner of claim 1, wherein at least a portion of the surface of the baffle has a plurality of raised dimples projecting toward said selected interior portion.

4. The fuel conditioner of claim 3 further including means for biasing the baffle means against the interior portion of the housing such that said dimples define the depth of the layer.

5. The fuel conditioner of claim 1, wherein said baffle means includes surface irregularities for creating turbulence in the flow of fuel.

6. The fuel conditioner of claim 1, wherein the heater includes an electrical resistance heating element having a positive coefficient of resistance such that the heat generated by the heating element decreases with increasing temperature of the element.

7. The fuel conditioner of claim 6, wherein the heater includes a heat conductive saddle member which defines said heating surface and is selectively detachably secured to said exterior of the housing, and said heating element is in intimate heat transfer contact with the saddle member.

8. The fuel conditioner of claim 1, wherein the baffle means and said interior portion of the housing define a flow passing boundary for said layer, the passage having a heated surface area to heated volume ratio in a range of about 12-20.

9. The fuel conditioner of claim 1, wherein the baffle means and said interior portion of the housing define a flow passage for said layer in which the flow velocity of the layer is greater than the flow velocity of the fuel anywhere else in the housing between the inlet and outlet ports.

10. A fuel conditioner comprising:
    a housing having a fuel inlet port, a fuel outlet port, and an inner defining a location for containing at least one filter element;
    a baffle plate situated within the housing between the inlet port and said location, the baffle plate conforming in shape with and being in adjacent closely spaced relation to a selected portion of the housing thereby defining a flow passage between the plate and the housing portion through which fuel makes a single pass from the inlet port to said location;
    heater means situated on the exterior of said portion of the housing, and having a heating surface in contact with and conforming to said exterior of said selected housing portion for controlling the temperature of the fuel passing through the flow passage by the transfer of heat through the housing portion to the fuel in the flow passage.

11. The fuel conditioner of claim 10, wherein the heater includes an electrical resistance heating element having a positive coefficient of resistance such that the heat generated by the heating element decreases with increasing temperature of the element.

12. The fuel conditioner of claim 11, wherein the heater includes a heat conductive saddle member which defines the heating surface in intimate heat transfer contact with said exterior of the housing, and said heating element is in intimate heat transfer contact with the saddle member.

13. The fuel conditioner of claim 11, wherein the heating element is powered by a constant voltage source and the ratio of maximum to minimum steady state heat generation rate of the heating element at constant voltage is at least about two between heating element temperatures of about 30 degrees F to 90 degrees F.

14. The fuel conditioner of claim 10, wherein the baffle means and said interior portion of the housing define a flow passage boundary such that the passage has a heated surface area to heated volume ratio in a range of about 12-20.

15. The fuel filter of claim 10, wherein the flow velocity of the fuel in the passage is greater than the flow velocity of the fuel anywhere else in the housing between the inlet and outlet ports.

16. The fuel conditioner of claim 10, wherein the heater means includes,
    a heat sink having an upper surface and a lower surface, the lower surface being contoured to intimately conform with said exterior of the housing;
    an electrically nonconducting cover member having upper and lower surfaces and being secured over the heat sink such that an enclosed volume is formed between the cover member and the heat sink;
    at least one heating element located in said enclosed volume in intimate contact with the upper surface of the heat sink;
    an electrically conducting plate located in said enclosed volume in intimate contact with the heating element and electrically insulated from the heat sink;
    first conductor means for electrically connecting the conducting plate to a voltage source; and
    second conductor means for connecting the heat sink to a reference ground voltage.

17. The fuel conditioner of claim 16, wherein all of said enclosed volume that is not occupied by the heating element and the conductor plate, is filled with potting compound.

18. The fuel conditioner of claim 16, wherein the cover member and heat sink have wing portions that fit together and thereby enclose said volume.

19. The fuel conditioner of claim 10, wherein the housing has top and side walls, the inlet port is in the upper portion of the housing adjacent the top wall and one side wall, and a vent port is provided in the upper portion of the housing adjacent the other side wall, and wherein the baffle plate extends from the inlet port to a location adjacent the vent port, such that the fuel is discharged from the passageway into the inner region, above the filter element.

20. The fuel conditioner of claim 19 wherein fuel in the fuel conditioner has a nominal level below the baffle plate during normal operation of the fuel conditioner, and the baffle plate includes a generally curved portion in which the convex side of the curved portion defines said passageway in part and the concave side defines an air pocket between the baffle plate and the normal level of fuel in the inner region during use.

* * * * *

UNITED STATES PATENT AND TRADEMARK OFFICE
CERTIFICATE OF CORRECTION

PATENT NO.  :  4,898,668
DATED       :  February 6, 1990
INVENTOR(S) :  David H. Hodgkins It is certified that error appears in the above-identified patent and that said Letters Patent is hereby corrected as shown below:

Column 5, line 3 of claim 8, "passing" should be --passage-- .

Column 5, line 3 of claim 10, after "inner" insert --region-- .

Signed and Sealed this

Fourteenth Day of July, 1992

Attest:

DOUGLAS B. COMER

*Attesting Officer*          Acting Commissioner of Patents and Trademarks